United States Patent
Ur

(10) Patent No.: US 11,207,852 B2
(45) Date of Patent: *Dec. 28, 2021

(54) THREE DIMENSIONAL PRINTING ON THREE DIMENSIONAL OBJECTS

(71) Applicant: Shmuel Ur Innovation LTD., Shorashim (IL)

(72) Inventor: Shmuel Ur, Shorashim (IL)

(73) Assignee: Shmuel Ur Innovation LTD, Shorashim (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/726,863

(22) Filed: Dec. 25, 2019

(65) Prior Publication Data

US 2020/0130299 A1 Apr. 30, 2020

Related U.S. Application Data

(63) Continuation of application No. 15/256,667, filed on Sep. 5, 2016, now Pat. No. 10,532,523.

(30) Foreign Application Priority Data

Sep. 6, 2015 (IL) .......................................... 241215

(51) Int. Cl.
| | |
|---|---|
| *B29C 73/02* | (2006.01) |
| *B33Y 10/00* | (2015.01) |
| *B33Y 30/00* | (2015.01) |
| *B33Y 50/02* | (2015.01) |
| *B29C 64/112* | (2017.01) |

(Continued)

(52) U.S. Cl.
CPC ............ *B29C 73/02* (2013.01); *B29C 64/112* (2017.08); *B29C 64/40* (2017.08); *B33Y 10/00* (2014.12); *B33Y 30/00* (2014.12); *B33Y 50/00* (2014.12); *B33Y 50/02* (2014.12)

(58) Field of Classification Search
None
See application file for complete search history.

(56) References Cited

U.S. PATENT DOCUMENTS

| | | | |
|---|---|---|---|
| 10,421,267 B2 * | 9/2019 | Reese | .................... B33Y 50/02 |
| 10,532,523 B2 * | 1/2020 | Ur | ......................... B29C 64/393 |

(Continued)

*Primary Examiner* — Yung-Sheng M Tsui
(74) *Attorney, Agent, or Firm* — The Law Office of Joseph L. Felber

(57) ABSTRACT

Embodiments of the invention allow performing an additive manufacturing process using a base object. Some embodiments enable placement of a three-dimensional base object inside a three-dimensional printer and print on the base object to produce a three-dimensional product. One exemplary embodiment is a method including: obtaining a representation of a three-dimensional physical object as a base object; obtaining a representation of a three-dimensional physical object as a product producible by adding layers of material on the base object. A representation of a support structure configured to retain the base object position within an additive manufacturing apparatus is determined, and the support structure is produced using an additive manufacturing process. Alternatively, a representation of an on-object structure determined and the on-object structure is produced using an additive manufacturing process by adding one or more layers of material on the base object.

11 Claims, 7 Drawing Sheets

(51) Int. Cl.
B29C 64/40 (2017.01)
B33Y 50/00 (2015.01)

(56) References Cited

U.S. PATENT DOCUMENTS

2015/0165683 A1* 6/2015 Cheverton ............ B29C 64/112
382/141
2016/0262442 A1* 9/2016 Davila .................... A23P 20/15

* cited by examiner

THREE DIMENSIONAL PRINTING ON THREE DIMENSIONAL OBJECTS

RELATED APPLICATIONS

This application is a continuation application claiming benefit under 35 U.S.C. § 120 to U.S. patent application Ser. No. 15/256,667, filed Sep. 5, 2016, which is hereby incorporated by reference in its entirety. U.S. patent application Ser. No. 15/256,667 claims priority under 35 U.S.C. § 119 to Israeli Patent Application No. 241215, filed Sep. 6, 2015, which is hereby incorporated by reference in its entirety without giving rise to disavowment.

TECHNICAL FIELD

The present disclosure relates to additive manufacturing in general, and to additive manufacturing using an existing base object, in particular.

BACKGROUND

Additive Manufacturing Process, often referred to as three-dimensional printing, is a process of producing three-dimensional products from three-dimensional model data, such as a digital representation. In Additive Manufacturing Process a product is often created by joining materials layer by layer until the entire product is created. Each layer can be seen as thinly sliced horizontal cross-section of the eventual product. In some cases, the Additive Manufacturing Process may utilize a variety of different materials to produce a product. Each layer is fused by adding material in desired locations.

The three-dimensional products produced in Additive Manufacturing Process can be of almost any shape or geometry, and may be produced in an Additive Manufacturing Apparatus from a three-dimensional model or other electronic data source, such as a three-dimensional printer. The Additive Manufacturing Process may be used to create a new object, to copy an existing object, or the like.

The Additive Manufacturing Process starts with making a virtual design of the product that is to be printed. In some cases, the virtual design is provided in a Computer Aided Design (CAD) file using a three-dimensional modeling program (for the creation of a new object) or with the use of a three-dimensional scanner (to copy an existing object). This scanner makes a three-dimensional digital copy, which may be retained, in a three-dimensional modeling format.

To prepare the digital file created in a three-dimensional modeling program for printing, software may slice the final model into hundreds or thousands of horizontal layers. When this prepared file is uploaded in the three-dimensional printer, the printer creates the object layer by layer. The three-dimensional printer reads every slice (or two-dimensional image) and proceeds to create the object blending each layer together, preferably with no sign of the layering visible, resulting in one three-dimensional object.

The Additive Manufacturing Process may involve different kinds of technologies to create the product, such as melting or softening material to produce the layers, Selective laser sintering (SLS), fused deposition modeling (FDM), or the like.

Additive Manufacturing or three-dimensional printing is moving from the realm of engineers and architects into the hands of hobbyists. It is only a matter of time before we have three-dimensional printers at home, or have access to one the same way we now get photographs printed.

BRIEF SUMMARY

One exemplary embodiment of the disclosed subject matter is a method comprising: obtaining a representation of a base object, wherein the base object is a three-dimensional physical object; obtaining a representation of a product, wherein the product is a three-dimensional physical object, wherein the product is producible by adding layers of material on the base object; determining a representation of a support structure configured in size and shape to retain the base object in a position within an additive manufacturing apparatus, wherein the position is associated with producing the product; and producing the support structure using an additive manufacturing process.

Optionally, in response to manual positioning of the base object within the additive manufacturing apparatus, producing the product by the additive manufacturing apparatus, wherein the manual positioning positions the base object so as to be supported by the support structure, whereby the base object is placed in the position, wherein said producing the product comprises adding layers of materials on the base object when positioned in the position.

Optionally, after the product is produced, notifying a user that the product can be removed from the support structure.

Optionally, the support structure is dispensable after the product is produced.

Optionally, said producing the support structure is performed by the additive manufacturing apparatus so as to be located in a location within the additive manufacturing apparatus, whereby the product can be produced without moving the support structure.

Optionally, the support structure is configured to allow a human to place the base object within the additive manufacturing apparatus in a desired location and position with an accuracy of about a size of a voxel.

Optionally, the support structure is configured to allow a human to place the base object within the additive manufacturing apparatus in a desired location and position with an accuracy of less than about 1 mm.

Optionally, the support structure comprises a first and second positioning area which are configured to support a first and a second portions of the base object, respectively.

Optionally, the support structure comprises a positioning area which is configured to support a portion of the base object, wherein the positioning area is located within a cone-like shape at a bottom portion of the cone-like shape, wherein a top portion of the cone-like shape comprises an opening through which the base object is placed on the support structure.

Optionally, said obtaining the representation of the base object comprises scanning the base object.

Another exemplary embodiment of the disclosed subject matter is a method comprising: obtaining a representation of a base object, wherein the base object is a three-dimensional physical object; obtaining a representation of a product, wherein the product is a three-dimensional physical object, wherein the product is producible by adding layers of materials on the base object; determining a representation of an on-object structure, wherein the on-object structure is configured to be produced on the base object, whereby assisting in placing the base object in a position which is suitable for producing the product; and producing the on-object structure using an additive manufacturing process by adding one or more layers of material on the base object.

Optionally, the on-object structure is configured in size and shape to allow a human to place the base object within an additive manufacturing apparatus in a desired location and position, wherein the desired location and position are associated with producing the product.

Optionally, desired location and position are of an accuracy of less than about 2 mm or of about two voxels.

Optionally, the on-object structure is configured in size and shape to mate with scaffolding which is configured to position the base object in the position.

Optionally, the on-object structure is a visible marker that visually indicates to a human an accurate placing of the base object so as to be in the position.

Optionally, after the base object is placed in the position using the on-object structure, producing the product by adding one or more layers of materials on the base object.

Optionally, the method further comprises: after the base object is placed in the position using the on-object structure, adding one or more layers of material on the base object; producing a second on-object structure, wherein the second on-object structure is configured to be produced on the base object, whereby assisting in placing the base object in a second position which is suitable for producing the product; after the base object is placed in the second position using the second on-object structure, adding one or more layers of material on the base object; whereby the product is produced in an iterative process in which two different positions are used to add material to the base object.

Optionally, the method further comprises: producing the product using the base object and the on-object structure; and after said producing, notifying a user that the on-object structure can be removed from the product.

Optionally, the method further comprises producing the product using the base object and the on-object structure, wherein the product comprises the on-object structure which is irremovable therefrom.

Optionally, a processor of a computerized apparatus is adapted to perform the steps of any of the above mentioned methods.

Yet another exemplary embodiment of the disclosed subject matter is a computer program product comprising a non-transitory computer readable storage medium retaining program instructions, which program instructions when read by a processor, cause the processor to perform a method comprising: obtaining a representation of a base object, wherein the base object is a three-dimensional physical object; obtaining a representation of a product, wherein the product is a three-dimensional physical object, wherein the product is producible by adding layers of materials on the base object; determining a representation support structure configured in size and shape to retain the base object in a position within an additive manufacturing apparatus, wherein the position is suitable for producing the product; and outputting the representation to be used in production of the product.

Optionally, said outputting comprises instruction an additive manufacturing apparatus to product the support structure.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
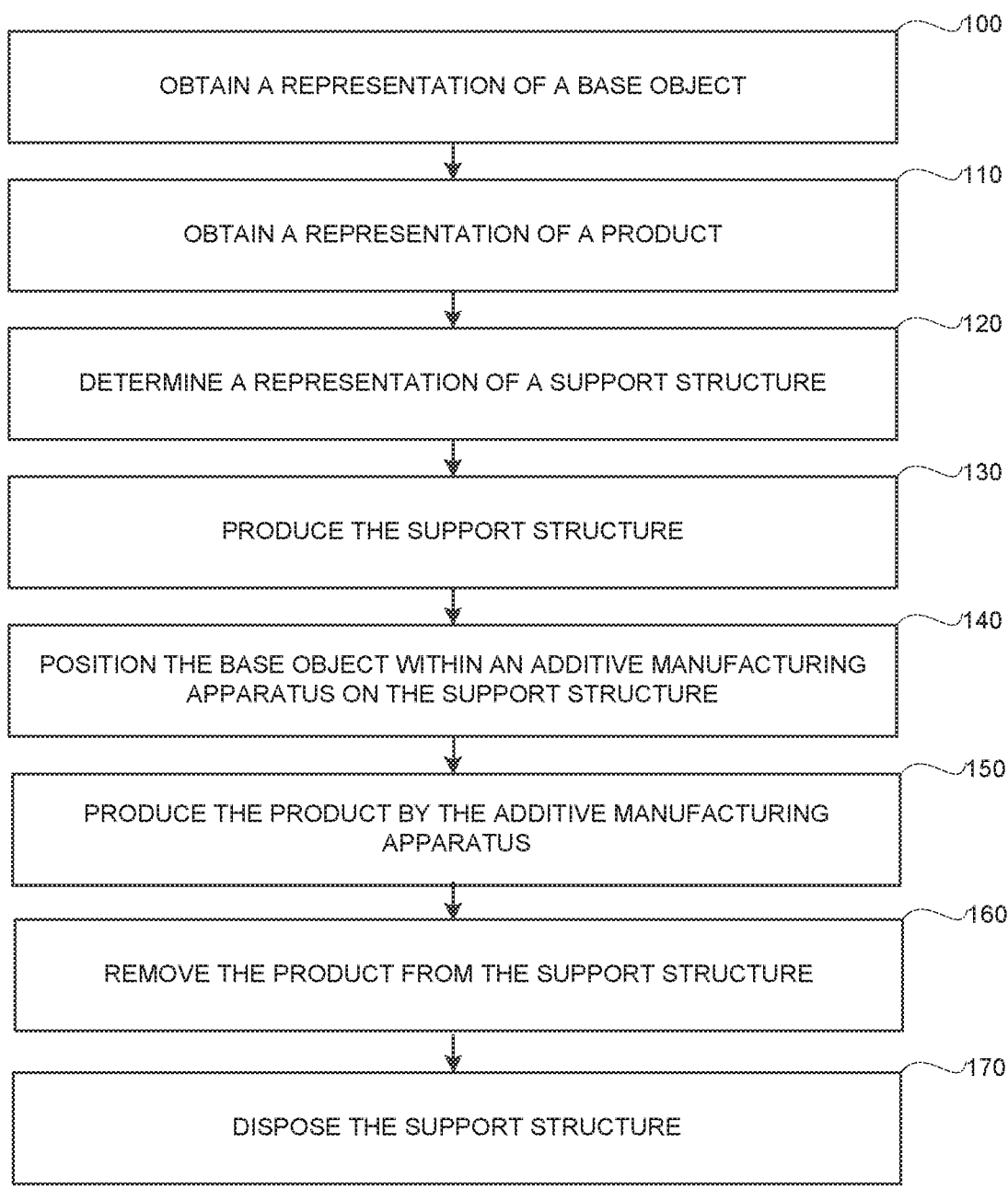
FIG. 1 shows a flowchart diagram of a method, in accordance with some exemplary embodiments of the disclosed subject matter.

One technical problem dealt with by the disclosed subject matter is to allow performing the additive manufacturing process using a base object. In some cases, placement of the base object may be of importance in order to allow for precise operation.

Another technical problem is to enable to place a three-dimensional base object inside a three-dimensional printer and print on the base object to produce a three-dimensional product.

The advantage of being able to print on existing objects may be, among other things, that these objects can be repaired or rebuilt with three-dimensional printers. In some exemplary embodiments, producing the three-dimensional product from the scratch may be impossible or difficult, especially if this production is performed at home or at a small business. Additionally or alternatively, producing the three-dimensional product from scratch may be too expensive comparing with printing on existing objects to create the final product, as the cost of printing a three-dimensional object is proportional to the amount of material used in the three-dimensional printing. As the cost of three-dimensional printing depends on the volume of material deposited by it, it may be likely that most of the object can be pre-made and only a last small amount of material is printed to allow for specific configuration.

Consider, as an example, a key. Majority of the product may be identical for different instances. The main difference between two keys may be the exact cuts of the key, which mate with specific pins in the corresponding lock. As such, both keys may be produced by using an existing base object and adding thereon specific embossments to create the exact cuts using additive manufacturing process during which material is added on the base object.

Additionally or alternatively, printing on existing objects may be desirable in many scenarios that are important due to variety of reasons: creating a three-dimensional product by printing on an existing object may be faster than creating the product in entirety, as also printing time may depend on the volume of material deposited by it, the smallest the amount of material is printed the faster it is. Additionally or alternatively, the base object may be an object that cannot be printed by an available printer, such as, for example, an electronic circuit, glass, food, or the like.

In some exemplary embodiments, in order to print on existing objects, the objects must be placed inside an additive manufacturing apparatus or a three-dimensional printer. In some exemplary embodiments, the objects must be positioned in a specific position within the additive manufacturing apparatus or the three-dimensional printer in order to allow an accurate print of material on the objects.

Yet another technical problem dealt with by the disclosed subject matter is to assist in placing a three-dimensional base object inside a three-dimensional printer, in a position that is suitable for producing a three-dimensional product by printing on top of the three-dimensional base object (e.g., by adding material on the base object).

In some exemplary embodiments, the three-dimensional base object may be a rounded structure, or of an irregular surface that may make the technical problem of placing the three-dimensional base object in a specific position within the three-dimensional product difficult. In some exemplary embodiments, placing the three-dimensional base object within the three-dimensional printer to print on may be a difficult mission, due to the base object shape, external surface, texture, material composition, or the like. As an example, placing a spherical object such like a ball within the three dimensional printer may be difficult as the spherical object may not have a base that can be used to lay the object in a specific desired position. As another example, in some cases, two or more base objects may be combined in order to create the three-dimensional product. The two or more base objects have to be positioned in a specific location or orientation compared to each other within the printer in order to enable printing on the two or more base objects.

Yet another technical problem dealt with by the disclosed subject matter is to instruct a user where and how to place a three-dimensional base object inside a three-dimensional printer, to enable accurate and precise printing onto the three-dimensional base object to produce a three-dimensional product. In some exemplary embodiments, the user may have to place the three-dimensional base object in a specific location (e.g., x, y, z location), angle (e.g., tilt, yawn and pitch values), or the like. In some exemplary embodiments, the user may not know how to accurately place the three-dimensional base object in the specific location and angle, and may need accurate instructions or means to place the three-dimensional object inside the three-dimensional printer. Additionally or alternatively, the user may need an explanation to how to place the three-dimensional object. Furthermore, in some cases, the production process may require that the base object be placed in different locations and/or angles during different stages of the production process. In such cases, the user may need an explanation as to how to place the base object during each such stage.

One technical solution is to produce a support structure configured in size and shape to retain the three-dimensional base object in a position within the additive manufacturing apparatus or the three-dimensional printer. The position may be associated with producing the three-dimensional product. The support structure may be produced by the additive manufacturing apparatus using an additive manufacturing process.

In some exemplary embodiments, the three-dimensional base object may be positioned within the additive manufacturing apparatus on the support structure. The support structure may locate the three-dimensional base object in the position associated with producing the three-dimensional product in a specific location, specific angle, or the like, to enable producing the three-dimensional product by printing on top of the three-dimensional base object. In some exemplary embodiments, the three-dimensional product may be produced by the additive manufacturing apparatus. The three-dimensional product may be produced by adding layers of materials on the three-dimensional base object, while the three-dimensional base object is positioned in the position. In some exemplary embodiments, the three-dimensional product may be removed from the support structure. Additionally, the support structure may be disposed thereafter. Alternatively, in some cases the support structure may be a part of the three-dimensional product and be incorporated therein.

Another technical solution is to produce an on-object structure that is configured to be produced on the three-dimensional base object. The on-object structure may assist in placing the three-dimensional base object in a position that is suitable for producing the three-dimensional product. The on-object structure may be produced using an additive manufacturing process by adding one or more layers of materials on the three-dimensional base object.

In some exemplary embodiments, the on-object structure may be configured in size and shape to allow a human to place the three-dimensional base object within an additive manufacturing apparatus in a desired position (e.g., location, angle or the like). The desired position may be associated with producing the three-dimensional product.

Additionally or alternatively, the on-object structure may be configured in size and shape to mate with a scaffolding, which is configured to position three-dimensional base object in the position. The on-object structure may be a structure used to support the three-dimensional base object in the position. As an example, the on-object structure may mate with a scaffolding that transfers the entire mass of the three-dimensional base object to the ground of the three-dimensional printer, where the three dimensional-object may lay on a base plate to spread the load, thereby provide for stable positioning that can be held during the additive manufacturing process. Additionally or alternatively, the on-object structure may align the three-dimensional base object with the scaffolding material to accurately position the three-dimensional base object within the three-dimensional printer.

In some exemplary embodiments, the three-dimensional product may be produced using an additive manufacturing process, such as by adding one or more layers of materials on the three-dimensional base object, after accurately positioning the three-dimensional base object within the additive manufacturing apparatus using the on-object structure.

In some exemplary embodiments, a second support structure—whether on-object or not—may be fabricated to assist in placing the base object within the additive manufacturing apparatus in a second position. The second position may be suitable for producing the three-dimensional product. In some exemplary embodiments, the three-dimensional product may be produced in an iterative process in which two or more different positions are used to add material to the three-dimensional base object.

In some exemplary embodiments, the on-object structure may be disposed from the three-dimensional base object after the additive manufacturing process. Additionally or alternatively, the product may be produced using the three-dimensional base object and the on-object structure, so the product contains the on-object structure and is irremovable therefrom.

Yet another technical solution is to produce an on-object visible marker on the three-dimensional base object. The on-object visible marker may visually indicate to a human an precise placing of the three-dimensional base object so as to b placed in a desired position within the additive manufacturing apparatus. The on-object visible marker may be produced using an additive manufacturing process by adding one or more layers of materials on the three-dimensional base object. The on-object visible marker may be for example a marker that indicates where to position scaffolds or other supporting structures on the three-dimensional object, how to position the three-dimensional object in each phase of the additive manufacturing process, or the like.

One technical effect of utilizing the disclosed subject matter is equipping existing simple three-dimensional additive manufacturing apparatuses with tools or methods to enable accurate printing on top of three-dimensional objects. Equipping existing simple three-dimensional additive manufacturing apparatuses with such tools, may enable existing simple three-dimensional additive manufacturing apparatuses, such as home-use three-dimensional printer to easily produce three-dimensional products. It will be understood, that the disclosed subject matter may be used by three-dimensional printers having a printer head with a limited movement options, such as only 3 degrees of freedom (e.g., movement along x, y, and z axis), 4 degrees of freedom (with only one rotational axis movement), or the like.

Another technical effect of utilizing the disclosed subject matter is personalizing production of three-dimensional products. Industrial produced objects are usually generic. Printing on generic objects may enable personalizing standard objects to befit a specific personal use. As an example, printing a specific handle or a hand specific coating on a product to make it fit a special hand, printing a special insole for a shoe to make it fit a specific feet anatomy, or the like. Printing on objects may turn a mass produced object into a personal one with relatively limited amount of resources.

Yet another technical effect of utilizing the disclosed subject matter is to enable a more efficient home production of three-dimensional objects. In some cases, the cost of printing per object may be much higher than in mass manufacturing, but may save up unnecessary stocking of products, transporting, or the like. Printing on objects may enable producing three-dimensional objects on demand.

Yet another technical effect of utilizing the disclosed subject matter is to easily repair three-dimensional objects. As non-limiting examples, utilizing the disclosed subject matter may enable printing on broken objects to repair them, coating of scratched objects, fixing wear and tear objects, or the like.

Yet another technical effect of utilizing the disclosed subject matter is reducing pollution and gaining environmental advantage. As an example, printing onto existing objects may enable recycling of non-perishable objects, reduce the pollution caused by mass manufacturing of variety of different similar products and instead focus on a single master product used by all consumers to provide for a personalized final product, or the like.

Referring now to FIG. 1, showing a flowchart diagram of a method in accordance with some exemplary embodiments of the disclosed subject matter.

In Step 100, a representation of a base object may be obtained. The base object may be a three-dimensional physical object. The representation of the object may be a data representation of the object. The representation may be a digital data file obtained by an I/O module such as 707 of FIG. 7. The digital file may be a Computer Aided Design (CAD) format file, a Standard Template Library (STL) format file, a Polygon File Format (PLY) format file, Virtual Reality Modeling Language (VRML) format file, X3D format file, or the like. Additionally or alternatively, the representation may be a digital representation that is not necessarily retained within any file. In some exemplary embodiments, the representation may be obtained by scanning the base object and creating a digital model thereof. Additionally or alternatively, the representation may be obtained from a digital library of representations that retaining representations of existing base objects. The digital library may be stored in a remote storage, a proximal storage, or the like.

In some exemplary embodiments, the base object may be obtained to be used in producing a product. The base object may be scanned by a scanner within the additive manufacturing apparatus, by an external scanner such as 760 of FIG. 7, or the like.

In some exemplary embodiments, the base object may be a damaged product. A fixed product may be created by adding material on top of the base object using additive manufacturing process. As non-limiting examples, the base object may be a scratched toy that may be fixed by adding layers of materials on the scratched surface to create a fixed toy, a damaged shoe that may be renewed by coating with layers of material, or the like. Additionally or alternatively, the base object may be a part of a final product that may be completed by adding layers of materials to produce the final product, instead of producing the entire final product. For example, the base object may be a template of a screwdriver, i.e. a screwdriver without a head. A head for the screwdriver may be printed on the template of the screwdriver, by adding layers of materials on the template of the screwdriver.

In some exemplary embodiments, the base object may be a part of a final product produced by a second different additive manufacturing apparatus using a different kind of material than used in the additive manufacturing apparatus. The final product may be produced in the additive manufacturing apparatus by adding layers of material on top of the base object. As an example, the base object may be a part of a jewelry. The jewelry may be made of two different materials, such or example metal and plastic. A first part of the jewelry made of the first material may be produced by a first additive manufacturing apparatus, received, bought, or the like. The second part of the jewelry made of the second material may be produced by a second additive manufacturing apparatus, by adding layers of the second material on the first part to finish creating the jewelry. In some exemplary embodiments, there may be more than two stages if more than two materials are desired.

In some exemplary embodiments, representations of two or more base objects may be obtained. The two or more objects may be combined by adding layers of material to produce a final product that combines the two or more separate base objects.

In Step 110, a representation of a product to be produced may be obtained. The product may be a three-dimensional physical object. The representation of the product may be a data representation of the product. The representation may be a digital data file obtained by an I/O module such as 707 of FIG. 7. The digital file may be a CAD format file, an STL format file, a PLY format file, a VRML format file, X3D format file, or the like. Additionally or alternatively, the representation may be a digital representation that is not necessarily retained within any file.

In some exemplary embodiments, the product may be producible by adding layers of materials on the base object.

In some exemplary embodiments, the product may comprise an internal portion and an external portion. In some exemplary embodiments, the base object may constitute the internal portion of the product. The external portion of the product may be produced by adding the layers of materials on the internal portion. As a non-limiting example, the external portion may be an external casing of at least a portion of the internal portion of the product. The external portion may be added to repair the product, strengthen the product, protect the internal portion or portion thereof, complete the internal portion to create the product, or the like. Additionally or alternatively, the external portion may be may be comprised of a different material composition than the internal portion, such as different color, different finish, or the like, which may be produced using a different production method or materials than those used to produce the base object.

In some exemplary embodiments, the base object may be produced in a previous additive manufacturing process. Additionally or alternatively, the base object may be an existing object, for example, an object that may not be possible to produce by an additive manufacturing process, an object that is more profitable to purchase than to create, an object that is easier to obtain than to create, an existing-recyclable object, or the like.

In some exemplary embodiments, a processor may analyze the base object and the product and determine how material can be added to the base object to create the product. In some cases, the processor may determine where material needs to be added and at which position the base object needs to be placed in order to add the material. Additionally or alternatively, a user may manually define the same parameters or portion thereof.

In Step 120, a support structure and representation thereof may be determined. In some exemplary embodiments, the support structure may be configured in size and shape to retain the base object in a position within an additive manufacturing apparatus. The position may be associated with producing the product. The representation of the support structure may be determined based on the representation of the base object and the representation of the product. Additionally or alternatively, the representation of the support structure may be determined based on physical properties of the base object, on the process of adding layers of materials on the base object to produce the product, or the like. As an example, the support structure may be determined so as to retain the base object in the position based on the shape of the base object, size of the base object, or the like. As another example, the support structure may be determined based on the locations on the base object on top which the layers of materials will be added to produce the product. Additionally or alternatively, the support structure may be determined based on the angle that the base object needs to be placed in in order to add the layers of materials on the base object to produce the product given constraints of the additive manufacturing apparatus (e.g., limited number of degrees of freedom).

Figure 7:
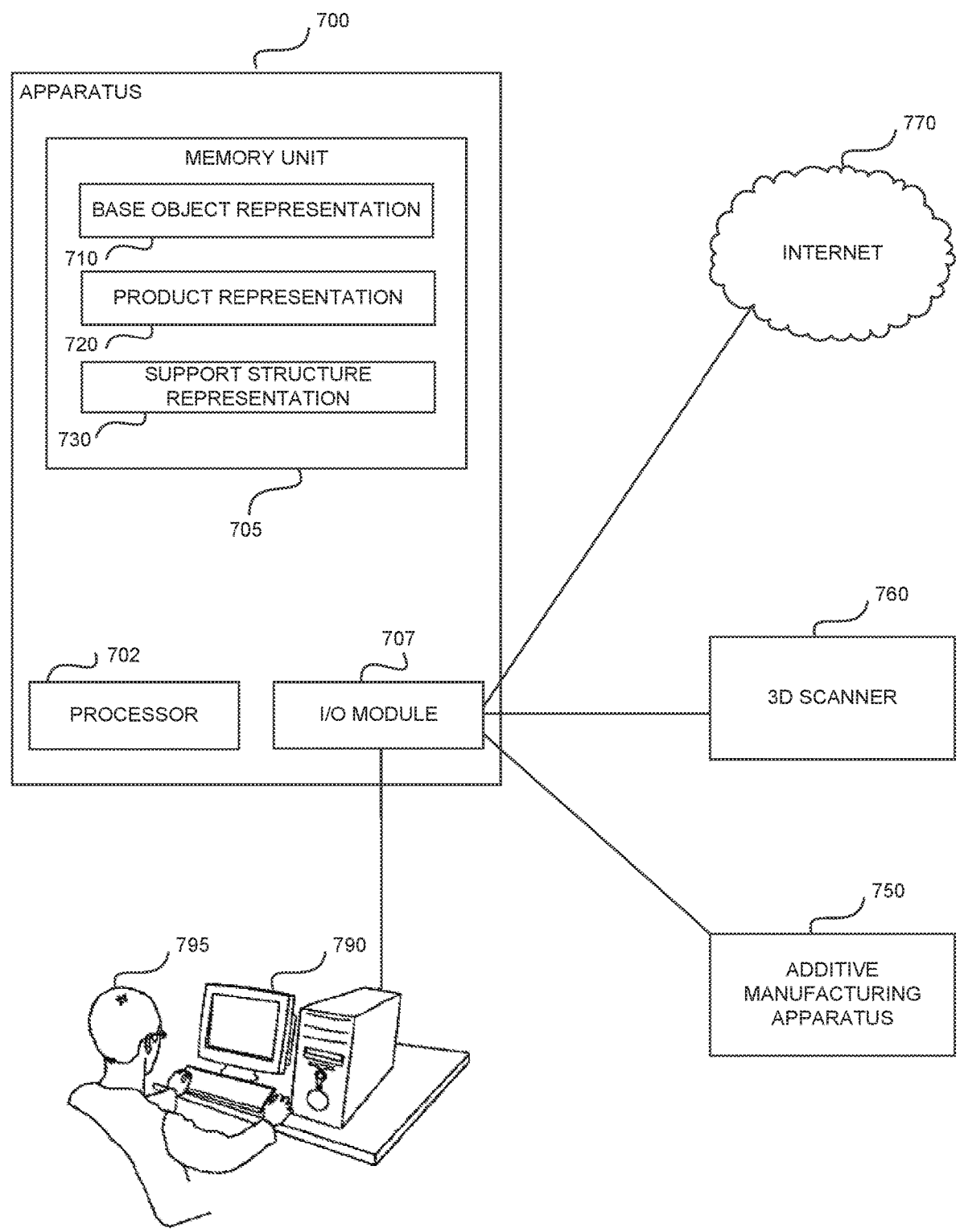
FIG. 7 shows a block diagram of an apparatus, in accordance with some exemplary embodiments of the disclosed subject matter.

In some exemplary embodiments, the representation of the support structure may be determined by a processor such as 702 of FIG. 7.

Additionally or alternatively, Steps 100-120 may be executed by a computerized device, such as a personal computer, in preparation for producing the product using an additive manufacturing apparatus.

In Step 130, the support structure may be produced. The support structure may be produced using an additive manufacturing apparatus. The support structure may be produced based on the representation of the support structure. In some exemplary embodiments, the support structure may be produced so as to be located in a location within the additive manufacturing apparatus or another additive manufacturing apparatus, whereby the product may be produced without moving the support structure. Additionally or alternatively, the user may be required to place the support structure in a specific position within the additive manufacturing apparatus.

In Step 140, the base object may be positioned within an additive manufacturing apparatus on the support structure. In some exemplary embodiments, the support structure may be configured to allow a human to place the base object within the additive manufacturing apparatus in a desired position with an accuracy of about a size of a voxel, size of two voxels, less than about 1 mm, less than about 2 mm, or the like. Additionally or alternatively, the support structure may be configured to allow a human to place the base object within the additive manufacturing apparatus in a desired position with an accuracy that may not affect producing the product.

In some exemplary embodiments, the support structure may comprises a positioning area which is configured to support a portion of the base object.

In some exemplary embodiments, the base object may be of a complex shape. The complex shape may require more than one support structure to position the base object. Additionally or alternatively, the support structure may comprise a first and second positioning areas. The first and the second positioning areas may be configured to support a first and a second portions of the base object, respectively.

In some exemplary embodiments, the positioning area may be located within a cone-like shape, such as conical frustum, cone, octagonal frustum, or the like. The cone-like shape may have a bottom portion and a top portion. The bottom portion may be proximal to the apical portion of the cone-like shape. The top portion may be wider than the bottom portion. The positioning area may be located within the bottom portion of the cone-like shape. The top portion of the cone-like shape may comprise an opening through which the base object may be placed on the support structure. In some cases, the gradient narrowing of the cone-like shape may be utilized to provide for accurate and precise placing of the base object on the support structure.

In Step 150, the product may be produced by the additive manufacturing apparatus. In some exemplary embodiments, production of the product may be executed by the same additive manufacturing that produced the support structure or by a different additive manufacturing apparatus. In some exemplary embodiments, an additive manufacturing apparatus, such as 750 of FIG. 7, may perform Step 150. The product may be produced based on the representation of the product. In some exemplary embodiments, producing the product may comprise adding layers of materials on the base object, which being positioned in a desired position in the additive manufacturing apparatus using the support structure.

In Step 160, the product may be removed from the support structure. Alternatively, in some cases the support structure may be a part of the product. As an example, the base object may be a cup, the product may be the cup with a handle, and the support structure may be a part of the handle.

In Step 170, the support structure may be disposed after the product is removed therefrom. Additionally or alternatively, the support structure may be used to produce more products similar to the product, onto base objects similar to the base object.

Figure 2:
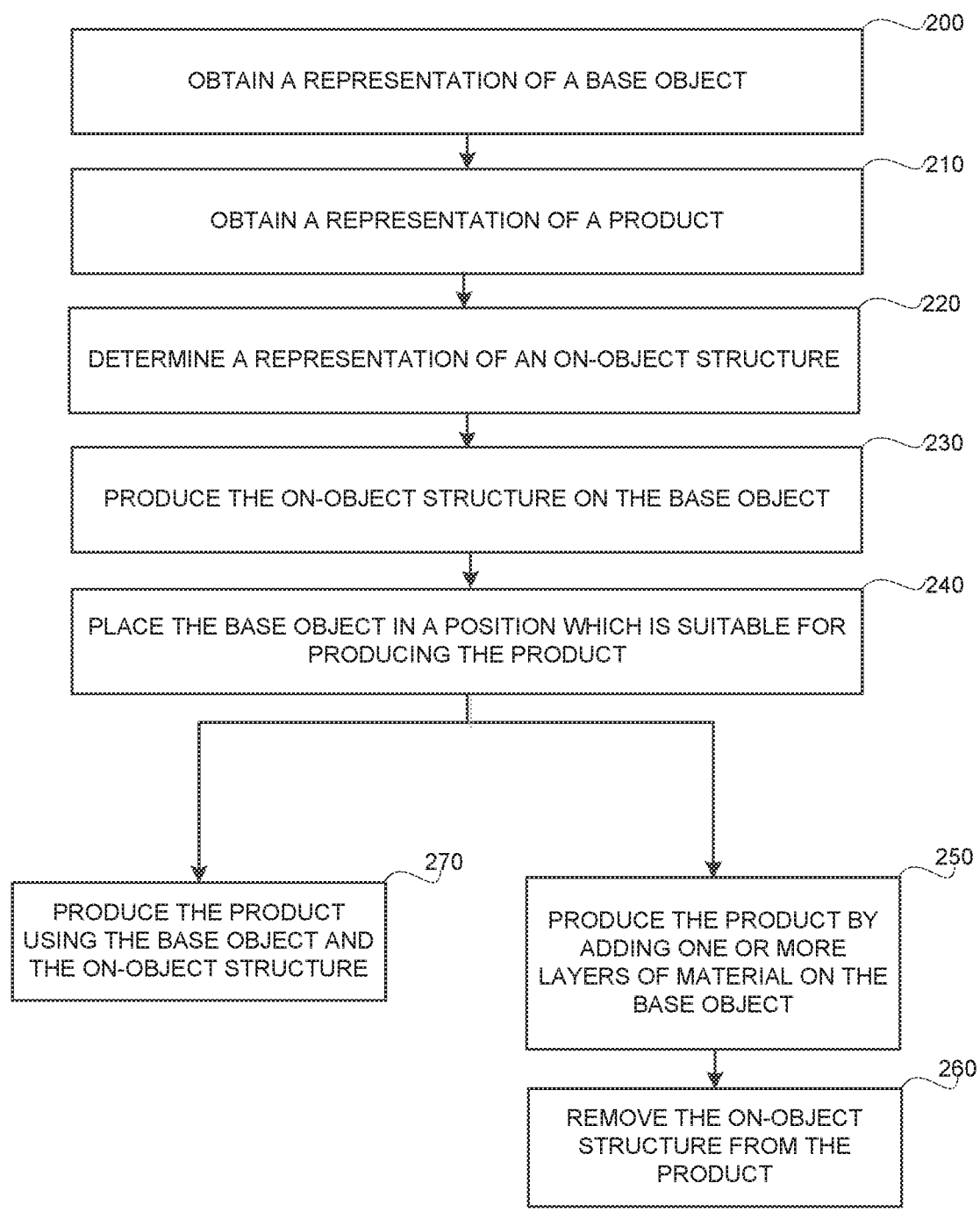
FIG. 2 shows a flowchart diagram of a method, in accordance with some exemplary embodiments of the disclosed subject matter.

Referring now to FIG. 2, showing a flowchart diagram of a method in accordance with some exemplary embodiments of the disclosed subject matter.

In Step 200, a representation of a base object may be obtained. The base object may be a three-dimensional physical object. Step 200 may be similar to Step 100 of FIG. 1.

In some exemplary embodiments, the base object may be scanned to generate the representation of the base object. The base object may be scanned by a three-dimensional scanner such as 760 of FIG. 7, a built-in scanner within an additive manufacturing apparatus, a contact three-dimensional scanner, a coordinate measuring machine (CMM), a laser scanner, or the like.

In Step 210, a representation of a product may be obtained. The product may be a three-dimensional physical object. The product may be producible by adding layers of material on the base object. Step 210 may be similar to Step 110 of FIG. 1. In some exemplary embodiments, the representation of the product may be retrieved from a memory unit such as 705 of FIG. 7. Additionally or alternatively, the representation of the product may be entered by a user such 795 of FIG. 7 using workstation such as 790 of FIG. 7.

In Step 220, a representation of an on-object structure may be determined. The on-object structure may be configured to be produced on the base object. In some exemplary embodiments, the on-object structure may assist in placing the base object in a position which is suitable for producing the product. Step 220 may be similar to Step 120 of FIG. 1. In some exemplary embodiments, a digital file retaining the representation of an on-object structure may be created. In some exemplary embodiments, the representation of the on-object structure may be sent to a third party entity to be used in producing the product such as, for example, an additive manufacturing apparatus, a. In some exemplary embodiments, the on-object structure may be determined based on a known pre-existing positioning of the base object in the additive manufacturing apparatus, such as in case the base object was a-priori placed in the apparatus and scanned.

In some exemplary embodiments, the on-object structure may be configured in size and shape to allow a human to place the base object within an additive manufacturing apparatus in a desired position. Optionally, the position is different from a pre-existing positioning of the base object. The desired position may be associated with producing the product. The desired position may assist in accurately adding layers of material on the base object to create the product. In some exemplary embodiments, the desired position may be of an accuracy of less than about 1 mm, less than about 2 mm, less than about a voxel, less than about two voxels, or the like.

Additionally or alternatively, the on-object structure may be configured in size and shape to mate with scaffolding. The scaffolding may be configured to position the base object in the desired location and position. The scaffolding may be an external structure to the base object which is used for supporting the base object during production of the product or for placing the object in a desired position. As an example, the scaffolding may have an abutment that is configured to mate with a corresponding protrusion within the on-object structure. In some exemplary embodiments, in order to achieve accurate positioning, a cone-like shape may be used to assist in accurately placing the on-object structure in its corresponding scaffolding.

In Step 230, the on-object structure may be produced using an additive manufacturing process. The on-object structure may be produced by adding one or more layers of material on the base object.

In some exemplary embodiments, the on-object structure may be a visible marker that visually indicates to a human an accurate placing of the base object so as to be in the position. The visual marker may be removable after being used. Additionally or alternatively, the visual marker may be covered by additional material added by the additive manufacturing process during the production of the product.

In Step 240, the base object may be placed in the desired position within an additive manufacturing apparatus. The position may be suitable for producing the product. The base object may be placed in the position using the on-object structure. In some exemplary embodiments, the on-object structure is used for supporting the base object. Additionally or alternatively, the on-object structure may be used in visually indicating to the user how to position the base object.

In Step 250, the product may be produced by adding one or more layers of material on the base object.

In Step 260, the on-object may be removed from the product. In some exemplary embodiments, the on-object may be disposed after being removed from the product.

In Step 270, the product may be produced using the base object and the on-object. In some exemplary embodiments, the product may contain the on-object structure and is irremovable therefrom. The on-object structure may or may not be covered by additional material added during Step 270.

Figure 3:
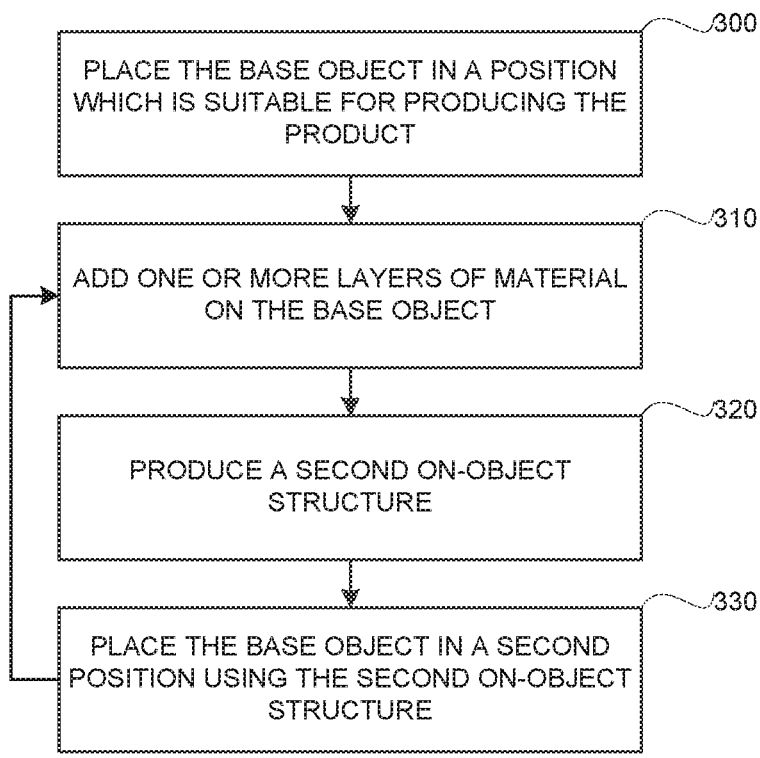
FIG. 3 shows a flowchart diagram of a method, in accordance with some exemplary embodiments of the disclosed subject matter.

Referring now to FIG. 3, showing a flowchart diagram of a method in accordance with some exemplary embodiments of the disclosed subject matter.

In Step 300, the base object may be placed in a first desired position within an additive manufacturing apparatus. The position may be suitable for producing the product. The base object may be placed in the position using a support structure, using an on-object structure, or the like.

In Step 310, one or more layers of materials may be added on the base object. The layers of materials may be added on the base object as a part of a first stage in the additive manufacturing process of producing the product.

In Step 320, upon completion of a first stage, a second desired position may be determined in order to proceed to a next stage in the additive manufacturing process. As an example, in some cases, the additive manufacturing apparatus may not be able to add material below the base object. Adding such material may require turning the base object up side down. In order to perform the next stage, a second on-object structure may be produced. The second on-object structure may assist in placing the base object in the second position.

In Step 330, the base object may be placed in the second position using the second on-object structure. In some exemplary embodiments, placing the base object in the second position may be essential for producing the product, as after adding the layers of materials on the base object, the position the base object was placed in using the on-object structure may not be suitable for additional adding layers of materials on the base object, or for adding layers of material on different locations on the base object, or other scenarios. In some exemplary embodiments, the placement of the base object may be performed manually or automatically.

After the placement of the base object in the second position, the next stage of production may be performed (Step 310). In some exemplary embodiments, the production of the product may include any number of stages which may be performed iteratively as exemplified by FIG. 3. In some exemplary embodiments, during different iterations, different materials may be added to the base object, such that an additive manufacturing apparatus that has only a single material cartridge may be used in producing a product that utilized a variety of material by replacing the material cartridge in each stage in accordance with a desired material.

In some exemplary embodiments, a product may be made from multiple materials, produced using multiple technologies, using different print-head units, or the like. For example, a plastic bowl, which is half white and half yellow, is produced using different colored materials. If the printer has a single print-head or a print-head having a single material cartridge, conventionally it cannot make such an object. However, the disclosed subject matter is useful for producing such products. In some exemplary embodiments, the production may initially be performed using a first material or technology. After the first material is used, the material may be replaced (e.g., by replacing a material cartridge), and a second material may be used to continue the process. In some exemplary embodiments, different printers may be used in different stages, such as when specific technologies are useful for some of the stages but not for others.

Referring now to FIGS. 4A, 4B, 4C and 4D, showing schematic illustrations of an apparatus, in accordance with some exemplary embodiments of the disclosed subject matter.

An Additive Manufacturing Apparatus (AMA) 400 may be utilized to produce three-dimensional objects. AMA 400 may be a three-dimensional printer, or any other apparatus that executes an additive manufacturing process. AMA 400 may be utilized to produce three-dimensional objects by laying down successive layers of materials under computer control.

In some exemplary embodiments, AMA 400 may be a home-use three-dimensional printer. The home-use three-dimensional printer may be a simple three-dimensional printer affordable for home use. As an example, instead of going to a store to buy an object made in a factory by injection molding (such as a measuring cup or a funnel), a person may instead print it at home from a downloaded three-dimensional model.

AMA 400 may utilize a digital a representation of a three-dimensional object, such as referred to in Step 120 of FIG. 1. In some exemplary embodiments, AMA 400 may slice the representation into digital cross-sections to successively use as a guideline for printing the three-dimensional product. In some exemplary embodiments, to perform an additive manufacturing process, AMA 400 may read the representation of the three-dimensional object lay down successive layers of liquid, powder, paper, sheet material, or the like, to build the three-dimensional object from a series of cross sections. These layers, which correspond to the virtual cross-sections, may be joined or automatically fused to create the final shape of the three-dimensional object.

In some exemplary embodiments, AMA 400 may comprise a three-dimensional scanner (not showed) to scan three-dimensional products and create representations of the three-dimensional products.

In some exemplary embodiments, AMA 400 may be capable of using multiple materials for creating the three-dimensional objects, printing in multiple colors, printing color combinations simultaneously, or the like. Additionally or alternatively, AMA 400 may have a limited number of material cartridges, such as one, two, ten, or the like, limiting the number of materials AMA 400 can add during its operation.

In some exemplary embodiments, resolution of AMA 400 may describe the layer thickness, X-Y resolution, a combination thereof, or the like. The layer thickness may be less than 100 µm. Additionally or alternatively, the layer thickness may be of the size of a voxel. Voxel is the smallest, most basic element produced by AMA 400. A voxel may represent a volumetric pixel in the three-dimensional object produced by AMA 400.

In some exemplary embodiments, Additive Manufacturing Apparatus 400 may comprise a Print Head 401. Print Head 401 may heat the printing material to create a flow of material to be added in layers to produce three-dimensional objects. Print Head 401 may turn the flow of the material on and off. In some exemplary embodiments, one or more motors (e.g., steppe motors, servo motors, or the like) may be employed to move Print Head 401 and adjust the flow. Print Head 401 may be moveable by AMA 400 along X, Y and Z axis (e.g., up/down, left/right, forward/back). Additionally or alternatively, Print Head 401 may have more than 3 degrees of freedom, such as allowing to change yaw, roll, pitch or combination thereof. In some exemplary embodiments, Print Head 401 may be positioned in a suitable (X,Y) coordinates to dispose the printing material downwards. After completing production of each layer of material, Print Head 401 may be moved up in the size of the thickness of one layer in the Z direction, and continue to produce the next layer.

In some exemplary embodiments, a computer-aided manufacturing (CAM) software package executed on a microcontroller may control Print Head 401. Additionally or alternatively, other software and/or hardware components may be used for controlling Print Head 401.

In some exemplary embodiments, a Support Structure 402 may be placed within a work area of AMA 400. Support Structure 402 may be a three-dimensional object produced by AMA 400 or a by a different additive manufacturing. Support Structure 402 may be produced based on a representation such as the representation of the support structure determined in Step 120 of FIG. 1.

Support Structure 402 may be configured in size and shape to retain a Base Object 403 in a position within AMA 400. The position may be associated with producing a product by adding layers of materials on Base Object 403. Base Object 403 may be positioned within AMA 400 on Support Structure 402, such as illustrated in FIG. 4B. As an example only, Base Object 403 appears to be round. Support Structure 402 may be used to position Base Object 403 in place to allow for Base Object 403 to be placed in a predetermined location and stay in such location without rolling during addition of material. In some exemplary embodiments, Support Structure 402 may be configured to exactly match physical attributes of Base Object 403, such as curves, size, texture, or the like.

In some exemplary embodiments, Support Structure 402 may be produced by AMA 400 in its work area. In such a case, Support Structure 402 may be used (e.g., Base Object 403 may be placed thereon) without moving Support Structure 402, thereby allowing AMA 400 to dictate precise and accurate placement of Support Structure 402.

In some exemplary embodiments, a portion of Support Structure 402 may be referred to as positioning area. The positioning area of Support Structure 402 may be a portion of Support Structure 402 that is configured to support a portion of Base Object 403.

In some exemplary embodiments, Support Structure 402 may comprise two or more separate parts. The two or more separated parts may be used to accurately and precisely position Base Object 403 in a desired position within work area of AMA 400. Each part of the two or more separate parts may comprise a positioning area. The positioning area of each part of the two or more separated parts may be used to support a different part of Base Object 403 to stay in the position.

Additionally or alternatively, a single support structure may comprise a first and second positioning areas. The first positioning area may be configured to support a first portion of Base Object 403, and the second positioning area may be configured to support a second portion of Base Object 403.

In some exemplary embodiments, Support Structure 402 may be configured to allow a human to place Base Object 403 in a desired position within AMA 400. Base Object 403 may be placed in the desired position with a desired accuracy and precision measurements, such as absolute measurements or relative measurements relating to a size of a voxel.

Figure 4A:
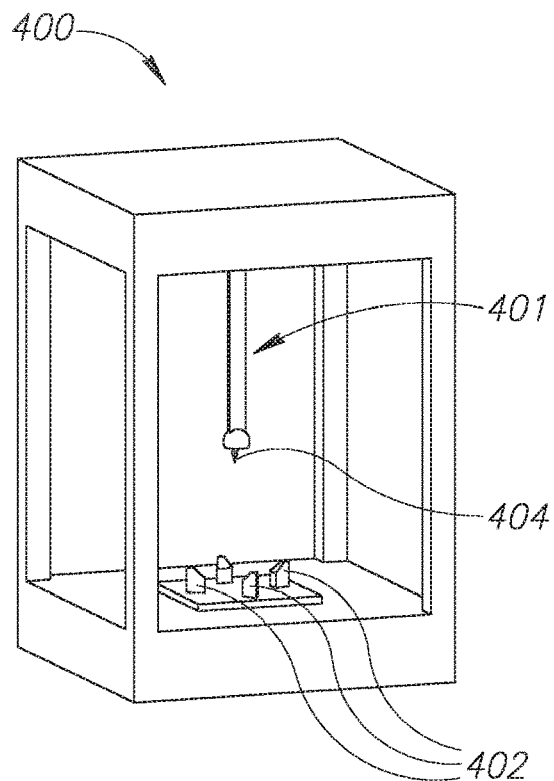
FIGS. 4A-4D show schematic illustrations of an apparatus, in accordance with some exemplary embodiments of the subject matter.
Figure 4B:
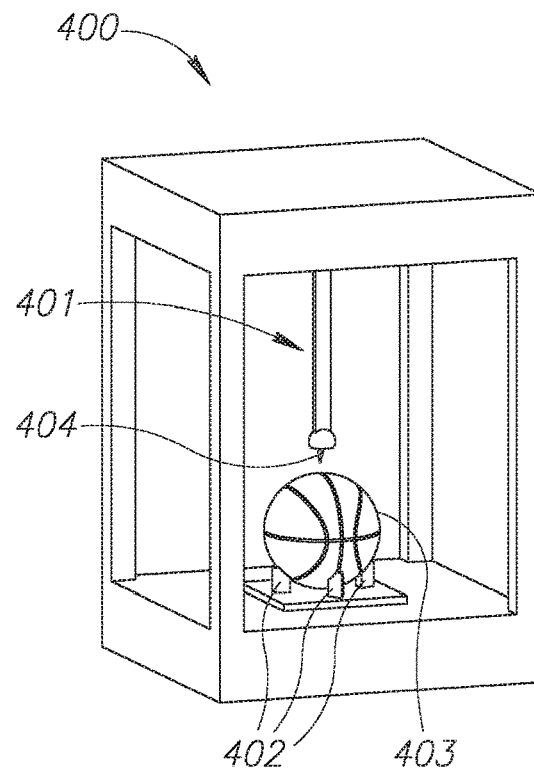
Figure 4C:
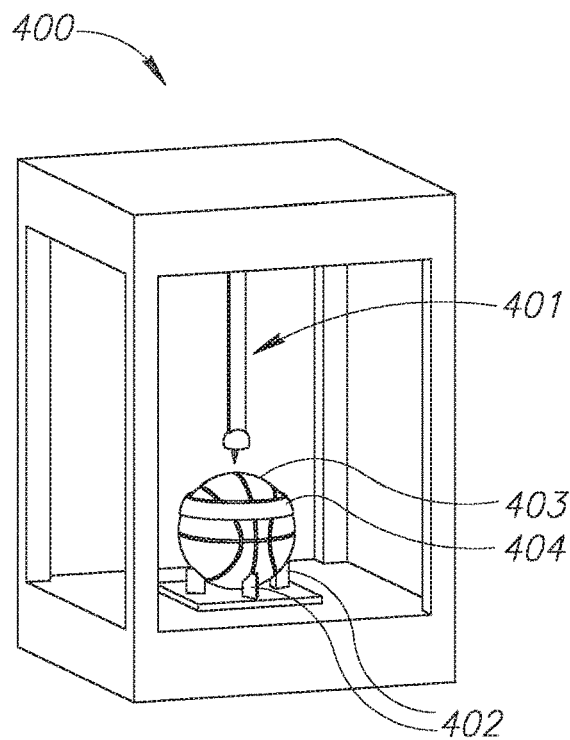

Referring now to FIG. 4C illustrating Base Object 403 to which Added Material 404 was added by AMA 400. After Added Material 404 has been added to Base Object 403, the produced product may be removed from Support Structure 402 and Support Structure 402 may be disposed of. Additionally or alternatively, Support Structure 402 may incorporated into the product, such as fused to Base Object 403 by Added Material 404. Additionally or alternatively, Support Structure 402 may be used to position more base objects similar to Base Object 403 in order to produce more products or to position Base Object 403 for a next stage of production.

Figure 4D:
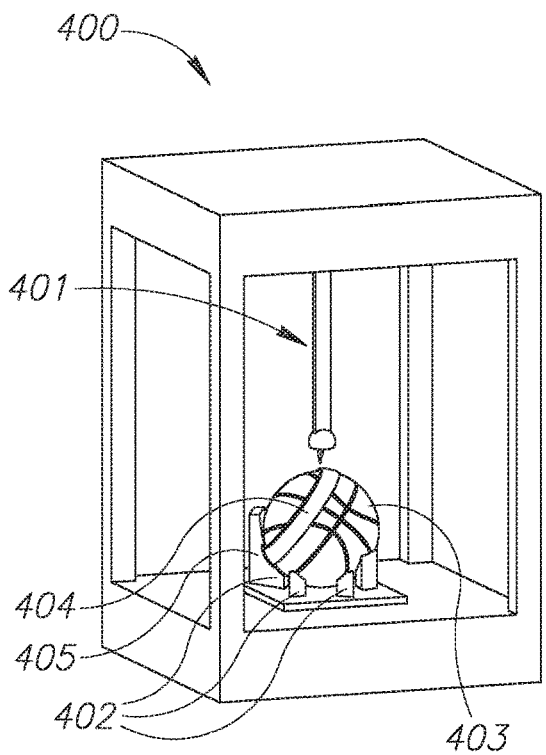

Additionally or alternatively, the additive manufacturing process of producing the product may comprise more steps. In some exemplary embodiments, a Second Support Structure 405 may be produced, such as illustrated in FIG. 4D. Second Support Structure 405 may be configured in size and shape to retain Base Object 403, along with the Added Material 404 in a second position within a work area of AMA 400. The second position may be used for a second stage of production (e.g., after Added Material 404 was added during a first stage) associated with producing the product by adding layers of materials on Base Object 403 after Added 404 have been added. In some cases, Base Object 403 may be positioned in the second position using both Support Structure 402 and Second Support Structure 405. Alternatively, Support Structure 402 may be removed after adding Added Material 404, and the object may be positioned using Second Support Structure 405 only for the next stage of production.

In some exemplary embodiments, Second Support Structure 405 may be an on-object structure. The on-object structure may be configured to be produced on the Base Object 403 to assist in placing Base Object 403 in the second position within AMA 400 after Added Material 404 was added.

Figure 5A:
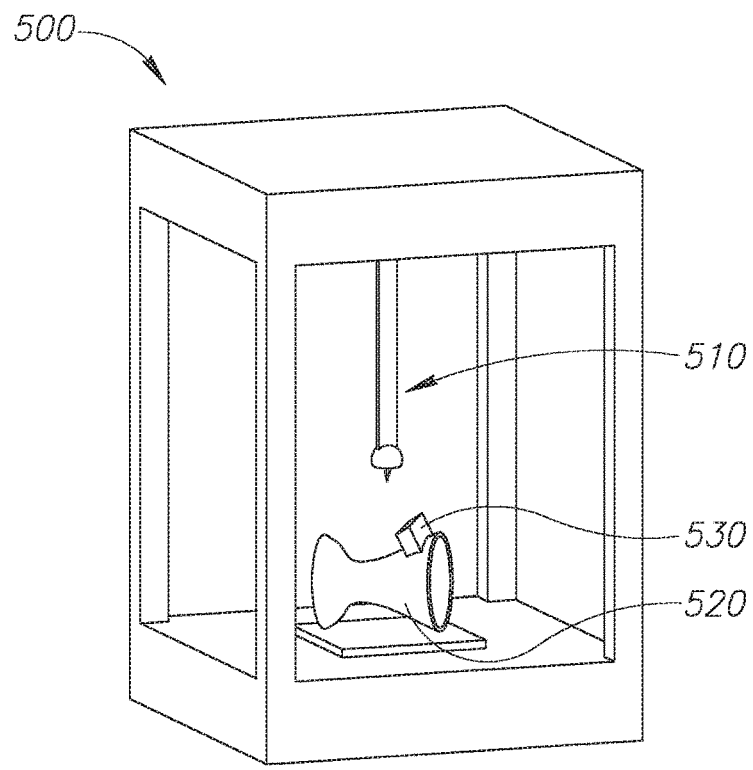
FIGS. 5A and 5B show schematic illustrations of an on-object structure, in accordance with some exemplary embodiments of the subject matter.

Referring now to FIG. 5A, showing a schematic illustration of an on-object structure in accordance with some exemplary embodiments of the disclosed subject matter.

An Additive Manufacturing Apparatus (AMA) 500, such as 400 of FIG. 4A, having a Print Head 510, may be utilized to produce three-dimensional objects. AMA 500 may be utilized to produce an On-Object Structure 530 on a Base Object 520.

In some exemplary embodiments, AMA 500 may be configured to scan Base Object 520 to create a digital representation thereof and to determine where on Base Object 520 On-Object Structure 530 should be added.

In some exemplary embodiments, On-Object Structure 530 may assist in placing Base Object 520 in a desired position in a work area of AMA 500. On-Object Structure 530 may be produced by AMA 500, or by a different additive manufacturing apparatus. In some cases, On-Object Structure 530 may be a support structure used to support the weight of Base Object 520 when placed in the work area of AMA 500. Additionally or alternatively, On-Object Structure 530 may mate with an external support structure, also referred to as scaffolding, ensuring that Base Object 520 is properly placed on the external support structure. In some exemplary embodiments, there may be a plurality of external support structures, each of which corresponds to a different on-object structure. Each on-object support structure may be produced so as to uniquely mate with its corresponding external support structure. Additionally or alternatively, the group of on-object structures and the group of external support structures may be characterized in allowing only the desired placement of the Base Object 520.

In some exemplary embodiments, On-Object Structure 530 may be a visible marker. The visible marker may visually indicate to a human an accurate and precise placing of Base Object 520 so as to be in the desired position. As an example, the visual marker may indicate a first portion of Base Object 520 to be supported by a first scaffolding and a second portion to be supported by a second scaffolding. The visual indicators may identify the correspond scaffolding using, for example, an identifier, a color of the corresponding scaffolding, or using other visual manners.

Figure 5B:
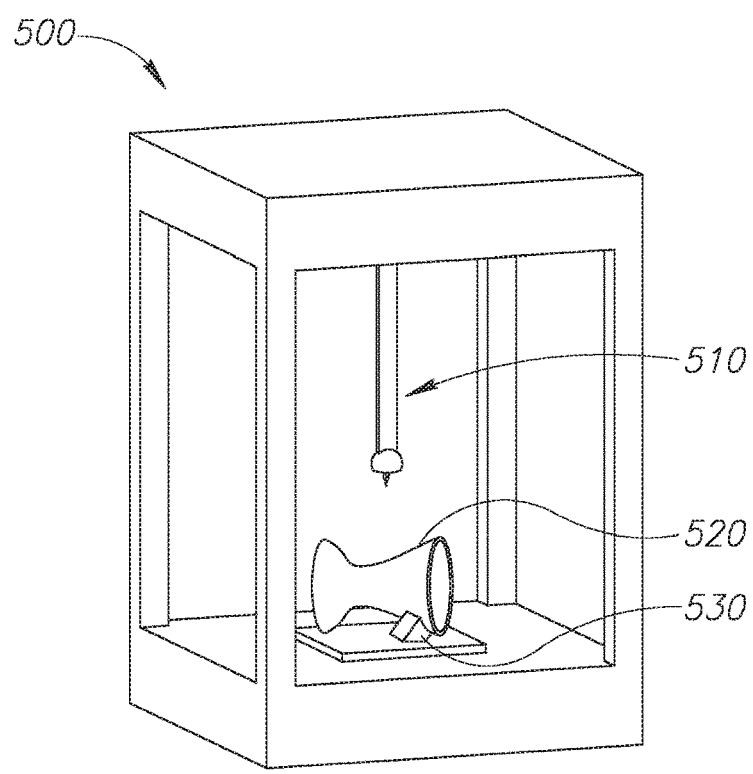

FIG. 5B exemplifies how On-Object Structure 530 can be utilized for the production of the product. Base Object 520 is placed into its desired position using On-Object Structure 530.

In some exemplary embodiments, prior to a first stage of production external structures may be produced by AMA 500. After a first stage is completed, on-object structures may be produced to allow precise and accurate position of the product in the second stage of production without having to move the base object from its original position thereby reducing amount of manual intervention in the process and avoiding a need to wait until the user can manually remove the object from the work area to clear the work area for production of second stage external structures.

Figure 6A:
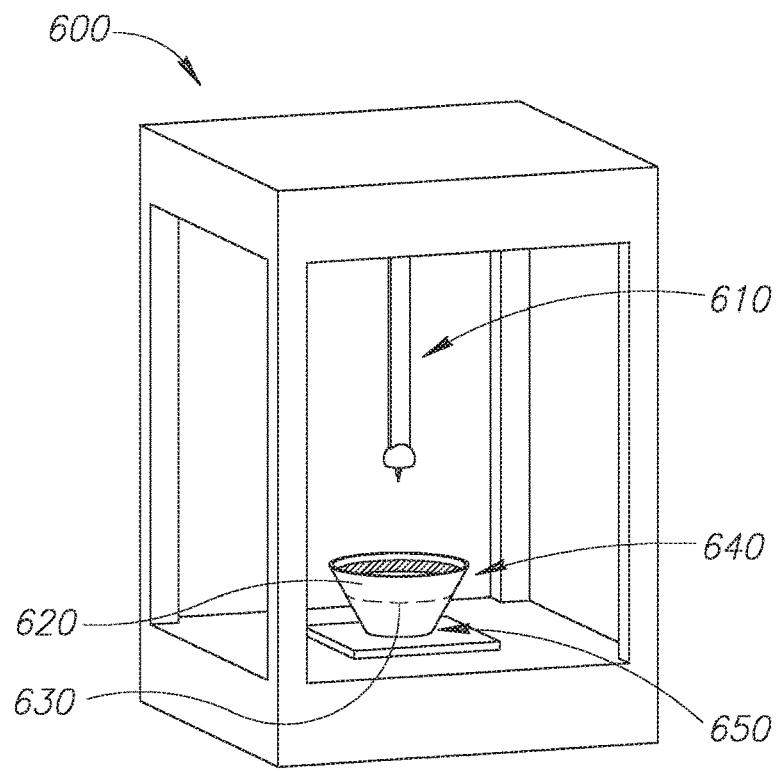
FIGS. 6A and 6B show schematic illustrations of a support structure, in accordance with some exemplary embodiments of the disclosed subject matter.
Figure 6B:
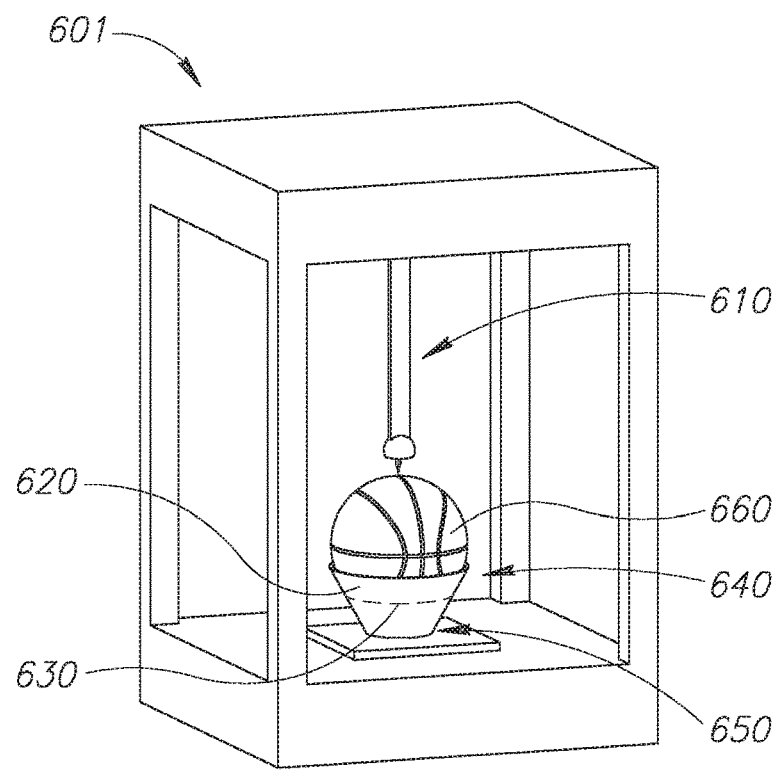

Referring now to FIGS. 6A and 6B, showing schematic illustrations of support structure and usage thereof, in accordance with some exemplary embodiments of the disclosed subject matter.

A Support Structure 620 may be produced by an AMA 600, such as 400 of FIG. 4A, to allow accurate and precise positioning of Base Object 660. In some exemplary embodiments, Support Structure 620 may have a cone-like shape, such as a conical frustum. The cone-like shape may comprise a Bottom Portion 650 and a Top Portion 640. The aperture of the Bottom Portion 650, which is in an apical portion of Support Structure 620, may be smaller than the aperture of Top Portion 640. The aperture may decrease along a vertical axis of Support Structure 620. The aperture of Top Portion 620 may be large enough to allow insertion of at least a portion of Base Object 660.

Support Structure 620 may comprise a Positioning Area 630 (exterior portion thereof is illustrated in the drawing). Positioning Area 630 may be configured to support a portion of Base Object 640. Positioning Area 630 may be in an interior portion of Support Structure 620 and used to support Base Object 640 when placed within Support Structure 620. As a result of the cone-like shape of Support Structure 620 inaccurate placement of Base Object 660 is avoided as Base Object 660 may slide along the vertical axis of Support Structure 620 until reaching an accurate and precise desired position, where it is supported by Positioning Area 630. In such an embodiment, the cone-like shape is used to guide Base Object 660 into the desired position without relying on accurate user placement.

Referring now to FIG. 7 showing a block diagram of components of an apparatus, in accordance with some exemplary embodiments of the disclosed subject matter. An Apparatus 700 may be a computerized apparatus adapted to perform methods such as depicted in FIGS. 1, 2, and 3.

In some exemplary embodiments, Apparatus 700 may comprise a Processor 702. Processor 702 may be a Central Processing Unit (CPU), a microprocessor, an electronic circuit, an Integrated Circuit (IC) or the like. Additionally or alternatively, Apparatus 700 can be implemented as firmware written for or ported to a specific processor such as Digital Signal Processor (DSP) or microcontrollers, or can be implemented as hardware or configurable hardware such as field programmable gate array (FPGA) or application specific integrated circuit (ASIC). Processor 702 may be utilized to perform computations required by Apparatus 700 or any of it subcomponents.

In some exemplary embodiments of the disclosed subject matter, Apparatus 700 may comprise an Input/Output (I/O) Module 707. Apparatus 700 may utilize I/O Module 707 as an interface to transmit and/or receive information and instructions between Apparatus 700 and external I/O devices, such as a Workstation 790, a 3D Scanner 760, the Internet 770, an Additive Manufacturing Apparatus (AMA) 750, or the like. It will be noted that in some embodiments, Apparatus 700 may itself be a 3D printer having a processor and using AMA 750 to produce products. Additionally or alternatively, 3D Scanner 760 may be an integral scanner in AMA 750 so as the work area where AMA 750 prints is scannable using 3D Scanner 760.

In some exemplary embodiments, I/O Module 707 may be used to provide an interface to a User 795 of the system, such as by providing output, visualized results, reports, or the like. User 795 may use Workstation 790 to define the product to be created and manner of using a base object in the production thereof. In some exemplary embodiments, Apparatus 700 can operate without human operation.

In some exemplary embodiments, a 3D Scanner 760 may be used. 3D Scanner 760 may be a device that analyses an existing tangible object and collects data on its shape and its appearance. The collected data may be a digital representation of the tangible object. In some exemplary embodiments, Base Object Representation 710 may be obtained from 3D Scanner 760.

In some exemplary embodiments, a partial object may be scanner by 3D Scanner 760. Apparatus 700 may identify what needs to be completed in order to achieve a desired final product, such as by comparing the scanned object with a representation of the product (e.g., Product Representation 720). AMA 750 may be used to complete the object autonomously. In some cases, Processor 702 may compute the difference between the scanned object and the desired object and determine where additional material needs to be added in order to produce the desired object. It will be noted that such an embodiment is different from asking the user to put a base object in the printer and adding an addition on it by printing. In this embodiment, a partial object is provided and the AMA 750 completes the object. A sample scenario is when a user wants to create, using a 3D printer, a perfect 2×2×2 cube. One can cheaply manufacture cubes, which are slightly smaller, not perfectly dimensioned, however the cheap manufacturing is not accurate enough. In the finishing process, the imperfect base object is used to produce a high quality/tolerance object. It will be noted that in such an embodiment, the base object is not a-priori known but rather dynamically determined based on the actual object provided. Such an embodiment may be used with different base objects and does not require the user to provide a precise and predetermined version of the base object.

In some exemplary embodiments, there is no description of a final product to be produced. In some cases, the base object is a deformed object, such as a shoe which was worn and deformed over time. 3D Scanner 760 may be used to scan the object and irregularities in the surface of the object may be located. AMA 750 may be used to fix the irregularities by printing. This can be used to fix scratches or bruises on a tire, shoe or plastic surface and make it look new. The object is put in the printer and is repaired. In one embodiment, a good surface and a bad surface can be marked as such by the user, and the bad surface will be fixed using the good surface as a model. Additionally or alternatively, machine learning may be used to identify the surface to be fixed. In one embodiment, supervised or unsupervised algorithms may be used based on user input to identify bad surfaces. In some cases, after a bad surface is identified, a good surface is located automatically, such as that is of a similar type than the bad surface but is not considered "bad" or is considered "good" with high probability or confidence measurements (e.g., a value above a predetermined threshold).

In some exemplary embodiments, Apparatus 700 may be connected to the Internet 770 or other computerized network. In some cases, Base object Representation 710, a Product Representation 720 or the like may be obtained from the Internet 770.

In some exemplary embodiments, an Additive Manufacturing Apparatus (AMA) 750 may be used to perform additive manufacturing process. In some exemplary embodiments, AMA 750 may be integral part of Apparatus 700 or external thereto.

In some exemplary embodiments, Apparatus 700 may comprise a Memory Unit 705. Memory Unit 705 may be persistent or volatile. For example, Memory Unit 705 can be a Flash disk, a Random Access Memory (RAM), a memory chip, an optical storage device such as a CD, a DVD, or a laser disk; a magnetic storage device such as a tape, a hard disk, storage area network (SAN), a network attached storage (NAS), or others; a semiconductor storage device such as Flash device, memory stick, or the like. In some exemplary embodiments, Memory Unit 705 may retain program code to activate Processor 702 to perform acts associated with any of the steps shown in FIGS. 1, 2, and 3. Memory Unit 705 may also be used to retain a Base Object Representation 710, a Product Representation 720, a Support Structure Representation 730, or the like.

In some exemplary embodiments, Memory Unit 705 may retain software operable to cause Processor 702 to perform acts that are useful in accordance with the disclosed subject matter. As an example, the software may be used to generate Support Structure Representation 730, to control AMA 750 to produce the support structure or the produce the product using the base object, or the like. In some cases, the software may analyse the product and base object and determine how the base object can be completed into the desired final product.

As can be appreciated, a 3D object to be produced is digitally represented by Product Representation 720 using any file format. In accordance with the disclosed subject matter, the representation may of an extension which describes the physical object that is put in the printer, and the 3D addition to it (e.g, Base Object Representation 710 representing the base object and Product Representation 720 representing the extension thereon. In some cases, a single representation may be used). In some exemplary embodiments, Base Object Representation 710 comprises only the outer layer of the object and not the internal structure thereof, as opposed to some embodiments of Product Representation 720 which may describe internal portions of the product that are to be produced during the printing process. Base Object Representation 710 may be used, for example, for determining desired location on the physical base object that is put in the AMA 730 and potentially scanned using 3D Scanner 760.

In some exemplary embodiments of the disclosed subject matter, User 795 may provide instructions, such as via Workstation 790, in accordance with the disclosed subject matter. For example, after a support structure is produced, a notification may be issued to the user requesting manual positioning of the base object using the support structure. As another example, a notification indicating to a user after production is completed that a support structure can be disposed may be issued. In some cases, a support structure may be reused in consecutive stages of the production, and a notification requesting retention of the support structure may be issued. As yet another example, upon product completion, the user may be notified that the product may be removed from the support structure.

Additionally or alternatively, Apparatus 700 may comprise a camera (such as, but not necessarily, 3D Scanner 760) that can visually capture images. In some cases, the position of the camera is a-priori known and in view of the position, the exact placement and orientation of the base object within a work area can be determined using computer vision methods. The exact placement and orientation of the object may be utilized to determine where AMA 750 should print to add material to the base object.

Additionally or alternatively, the camera may be external to AMA 750 and its placement may not be known. In such a case, relative location of the print head may be determined using images captures by the camera and may be used to direct the print head to the desired location in relation to the base object where material is to be added. In such an embodiment, software component may issue movement commands to the print head and analyse their results as depicted by an image captured by the camera in an iterative manner until the print head is positioned as desired relatively to the base object. Additionally or alternatively, software component may track movement commands and their results as depicted in the images captured by the camera to map relative location to absolute location, to determine position of the camera, or the like.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An apparatus comprising:
    a scanner,
    a processor; and
    wherein said apparatus is coupled to a 3D printer having a work area;
    wherein said processor is configured to:
        instruct said scanner to scan a pre-existing base object that is placed in the work area of the 3D printer, wherein the base object is a physical object, wherein the base object is created without using the 3D printer, thereby obtaining a digital representation of the base object;
        determine, based on the digital representation of the base object, a printing scheme for the 3D printer, wherein the printing scheme comprises printing instructions that are configured to add material to the base object in an additive manufacturing process in order to produce a product, wherein the printing scheme comprises printing instructions for printing a positioning structure, wherein the positioning structure is configured to position the base object in a position that enables the 3D printer to produce the product, wherein the product comprises, as a part thereof, the base object, wherein the positioning structure comprises a support structure or an on-object structure, wherein the position defines an angle or a location of the base object within an accuracy threshold; and
        instruct to 3D printer to implement the printing scheme, wherein said instructing is configured to cause the 3D printer to print the positioning structure, and enable to utilize the positioning structure for producing the product, whereby implementing the printing scheme is performed independently from creation process of the base object.

2. The apparatus of claim 1, wherein the printing scheme is determined by:
    comparing the digital representation of the base object with a digital representation of the product to determine additional material to be added to the base object in order to produce the product.

3. The apparatus of claim 1, wherein the printing scheme comprises instructions to add material in one or more locations in the base object in order to fix deformation of the base object and thereby provide the product, whereby a deformed product is fixed.

4. The apparatus of claim 3, wherein the printing scheme is determined based on a user indication of a deformed surface in the base object; and wherein the one or more locations correspond to the deformed surface.

5. The apparatus of claim 4, wherein the printing scheme is determined based on an indication of the user of a non-deformed surface in the base object; and wherein the printing scheme is determined to modify the deformed surface to become similar to the non-deformed surface.

6. The apparatus of claim 3, wherein said processor is configured to automatically locate a deformed surface in the base object to be fixed in the base object, wherein the automatic location of the deformed surface is performed using the digital representation of the base object, wherein the printing scheme is configured to add material at the deformed surface to fix deformation of the base object.

7. The apparatus of claim 1, wherein the base object is a deformed product, whereby the apparatus is configured to repair the base object to yield the product.

8. A method for printing with a 3D printer having a work area, the method comprising:
    scanning, using a scanner, a pre-existing base object that is placed in the work area of the 3D printer, wherein the base object is a physical object that is created without using the 3D printer, thereby obtaining a digital representation of the base object;
    determining, based on the digital representation of the base object, a printing scheme for the 3D printer, wherein the printing scheme comprises printing instructions that are configured to add material to the base object in an additive manufacturing process in order to produce a product, wherein the printing scheme comprises printing instructions for printing a positioning structure, wherein the positioning structure is configured to position the base object in a position that enables the 3D printer to produce the product, wherein the product comprises, as a part thereof, the base object, wherein the positioning structure comprises a support structure or an on-object structure, wherein the position defines an angle or a location of the base object within an accuracy threshold; and
    implementing, by the 3D printer, the printing scheme, wherein said implementing comprises printing the positioning structure, and enabling to utilize the positioning structure for producing the product, whereby the 3D printer produces the product independently from a creation process of the base object.

9. The method of claim 8, wherein the printing scheme is determined by:
    comparing the digital representation of the base object with a digital representation of the product to determine additional material to be added to the base object in order to produce the product.

10. The method of claim 8 further comprises:
    obtaining a user indication of a deformed surface in the base object;
    wherein the printing scheme comprises instructions to add material at the deformed surface of the base object, whereby fixing the deformed surface of the base object.

11. The method of claim 8, wherein the base object is a deformed product, whereby the method is configured to repair the base object to yield the product.

* * * * *